April 30, 1929.  H. H. BRAND  1,711,135
LUBRICATING APPARATUS
Filed May 15, 1924   2 Sheets-Sheet 1
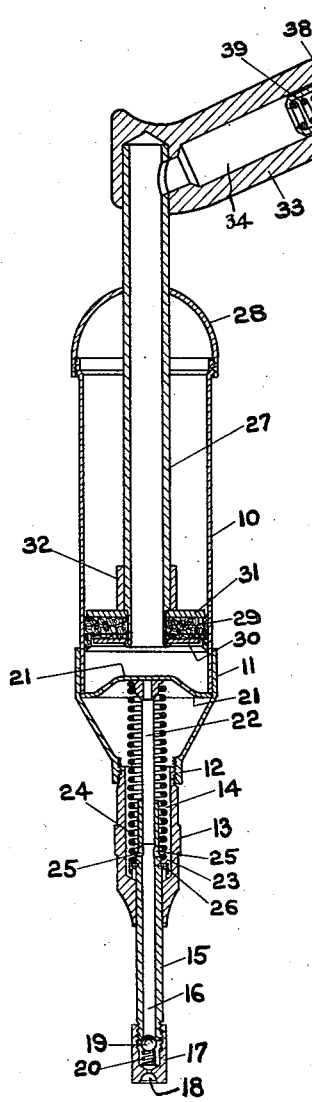
Fig. 2
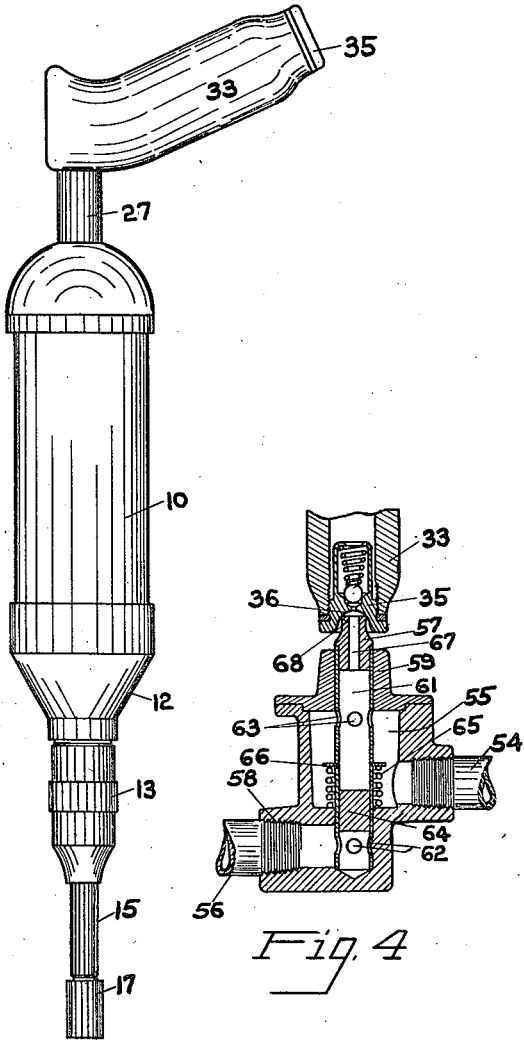
Fig. 1
Fig. 4
INVENTOR
Harold H. Brand
BY
Richey, Slough & Watts
ATTORNEYS

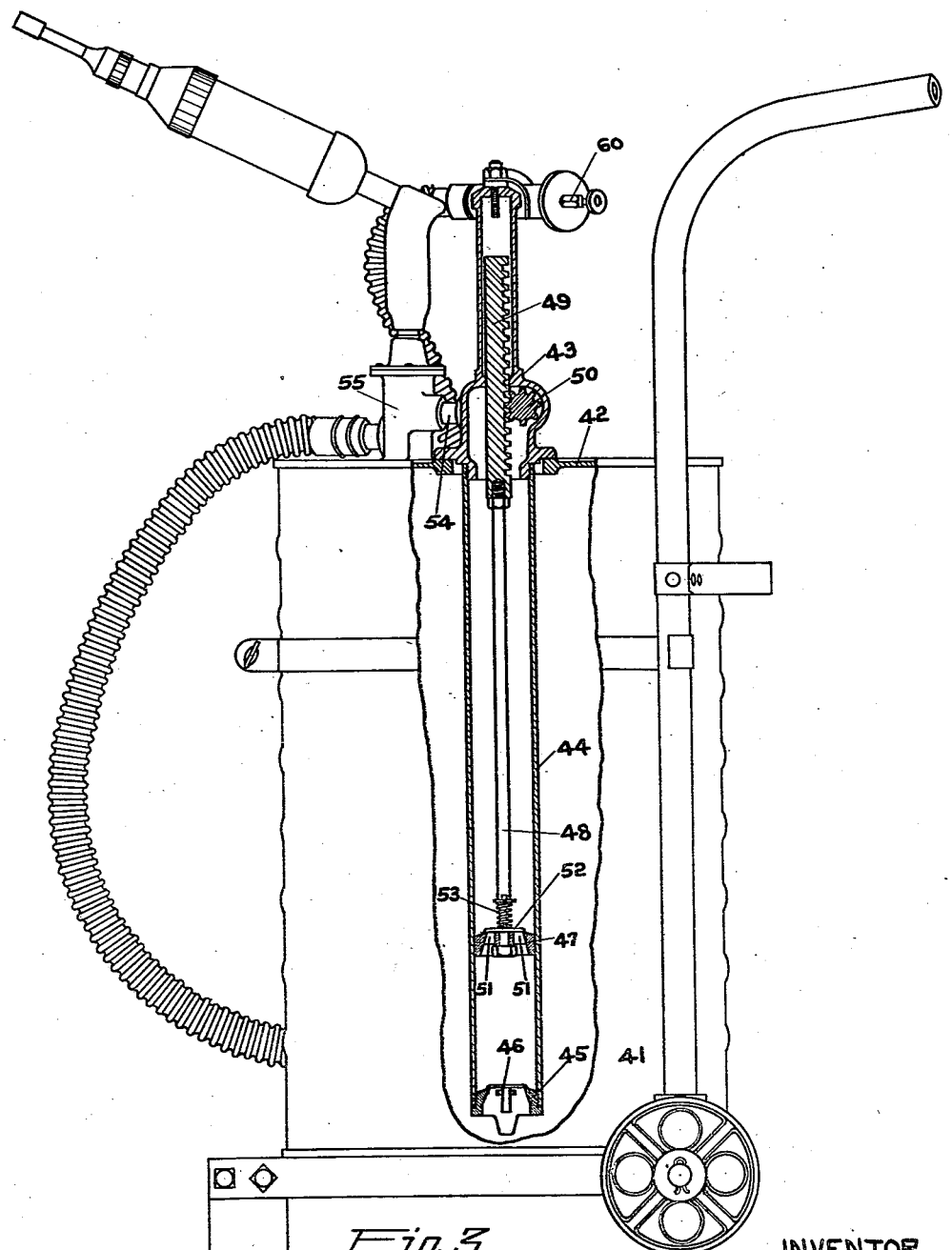

Patented Apr. 30, 1929.

1,711,135

UNITED STATES PATENT OFFICE.

HAROLD H. BRAND, OF CLEVELAND, OHIO, ASSIGNOR, BY MESNE ASSIGNMENTS, TO THE ALEMITE MANUFACTURING CORPORATION, OF CHICAGO, ILLINOIS, A CORPORATION OF DELAWARE.

LUBRICATING APPARATUS.

Application filed May 15, 1924. Serial No. 713,407.

This invention relates to lubricating apparatus, and more particularly to mechanism whereby the container can be filled with lubricant.

In the apparatus which are now used for lubricating bearings, it is necessary to disassemble the container and the ejecting mechanism to supply the container with a new charge of the lubricant. The qualities of lubricant are such that in charging the container in this manner, the user experiences some difficulty in filling the container and in reassembling the apparatus after filling the container. Such a filling operation takes considerable time and is objectionable to the user as the lubricant usually gets on his hands during the operation.

The object of my invention is to provide a lubricating apparatus which can be filled with lubricant from an external source without disassembling the apparatus.

Another object of my invention is to provide a lubricating apparatus having an inlet filling opening through which lubricant can be injected while held in leak-proof contact with a source of supply.

Another object of my invention is to provide a filling inlet which is provided with a self-closing valve to prevent lubricant from escaping when the apparatus is detached from a source of lubricant supply.

These and other objects and the invention itself will be more clearly understood from the following detailed description.

In the accompanying drawings, Figure 1 illustrates a side elevation of a lubricating apparatus embodying my invention; Fig. 2 is a medial vertical sectional view of the same; Fig. 3 is a side elevation of the apparatus held in communication with a filling reservoir; and Fig. 4 is a sectional view of the contacting face of the filling inlet of the apparatus in leak-proof engagement with the outlet face of the lubricant reservoir.

Referring now to the drawings by characters of reference, the container for the lubricant comprises a cylindrical shell 10, upon one end of which is pressed an outlet member 11. The outer end 12 of such member is of reduced diameter and threaded internally, the wall intermediate the ends of the member tapering in conical form. A hollow nozzle 13 is screwed into the threaded end of the container outlet in axial alignment therewith.

The nozzle is provided with an axially extending bore 14 which is of reduced diameter at its outer end. A dispensing nozzle 15 is slidably mounted within the bore in the hollow nozzle and is of a diameter to form a substantially leak-proof fit within the reduced portion of the nozzle bore. The dispensing nozzle has a passage 16 extending axially therethrough, and a hollow contact member 17 is screwed upon the end of the dispensing nozzle externally of the nozzle 13. The end face 18 of the contact member is formed with a concave recess, for engagement against a bearing nipple, and a passage is provided intermediate the recess and the interior of the member. A ball valve 19 is adapted to normally seat against the end of the dispensing nozzle, and is normally so maintained by a coil spring 20 carried within the contact member. When there is pressure within the apparatus against the valve the spring will be compressed and the valve will permit lubricant to pass into the contact member, but when there is no pressure against the lubricant the valve will be closed and prevent the lubricant from passing into the contact member.

An aperture washer 21 extends across the end of the shell 10 and is secured in such position by the tapered wall of the outlet member. A plunger 22 is secured at one end to the washer and extends into the open end of the dispensing nozzle 15. A bearing element 23 is secured to the dispensing nozzle within the nozzle 13 and a coil spring 24 extends intermediate the washer 21 and the bearing element, surrounding the plunger and the inner end of the dispensing nozzle. Openings 25 extend transversely through the dispensing nozzle in a position below the end of the plunger when in normal inoperative position. The contact member will limit the inward movement of the dispensing nozzle, and a member 26 is secured to the bearing element 23 to limit the outward movement of the dispensing nozzle. It will be seen that the lubricant is free to pass from the container through the base of the nozzle and through the apertures 25 into the dispensing nozzle, when the plunger is in normal position above the apertures. When the dispensing nozzle is telescoped inwardly, by pressing it against a nipple bearing, the plunger closes the apertures and compresses the lubricant thereby trapped within the dispensing nozzle, forcing it through the passage in the contact face of the contact member.

A hollow plunger rod 27 extends axially into the container through an opening in the cap 28 which is screwed upon the end of the shell 10. A piston 29 is carried by the rod and is supported by washers 30 and 31. The end of the rod is spun outwardly to retain the piston and washers thereupon and a retainer 32 is secured to the rod just above the piston. A handle 33 is secured upon the outer end of the piston rod and ordinarily the apparatus is operated while held by its handle. The contact face of the outlet member is placed against a bearing nipple and the user then exerts pressure upon the handle telescoping the dispensing nozzle to dispense the lubricant therefrom, and the piston creates pressure against the lubricant, in the shell, so that a charge of lubricant will automatically pass into the dispensing nozzle when the apertures 25 are open after each ejecting operation.

A passage 34 extends through the handle 33 and is in open communication with the open end of the piston rod which extends into the handle. An inlet member 35 is secured into the end of the passage in the handle, and lubricant is injected therethrough, passing through the handle and the piston rod and entering the container beneath the piston. A concave semi-spherical recess 36 is formed in the end of the inlet member and a passage 37 extends centrally therefrom axially through the inlet member. A ball valve 38 is normally seated against the outlet end of the passage and is so maintained by a coil spring 39. The inner end of the inlet member provides a cage 40 which is flanged to retain the spring therein. The valve will open when lubricant from an external source is injected under pressure into the passage 37, but will close automatically when the injection ceases and prevents escape of the lubricant from within the handle.

A lubricant reservoir 41 adapted to be transported is provided with a central aperture in its top wall 42, through which a pump casing extends. Such casing consists of a hollow housing 43 secured upon the top of the reservoir over the aperture and a shell 44 which is screwed upon the inner end of the housing. An inlet member 45 is secured in the lower end of the shell, and a slidable valve 46 is mounted to normally close the passage through said inlet. This valve establishes or prevents communication between the casing and the reservoir tank. A piston 47 is slidable in the shell 44 and is secured to the end of a piston rod 48 which has a rack 49 secured to the upper end thereof. A hand operated gear 50 is rotatably mounted within the hollow housing and meshes with the rack. The piston is provided with apertures 51 therethrough and a valve 52 is slidable on the piston rod and normally closes the apertures in the piston, being so maintained by the coil spring 53. The reciprocation of the piston draws lubricant from the tank into the pump casing and forces it through the outlet 54 leading from the housing. When the operator rotates the gear 50 in one direction, the piston will move downwardly in the casing, opening valve 52 and forcing the lubricant above the valve 46 above the piston. When the gear is rotated in the opposite direction the piston moves upwardly closing the valve 52, and compressing the lubricant thereabove, forcing it through the outlet. The upward movement of the piston opens valve 46 and draws lubricant into the shell from the tank for the next charging operation. It will therefore be seen that reciprocation of the plunger will draw lubricant into the casing from the tank and force it through the outlet 54.

The outlet 54 leads into a distribution chamber 55 through which the lubricant is conveyed to a conduit 56 or to a nozzle 57, adapted to form a leak-proof contact with the contact face 36 of the lubricating apparatus. The chamber is formed with two outlet ports 58 and 59. The flexible conduit is connected to the outlet 58 and is provided at its end with a nozzle 60 adapted to be maintained in leak-proof contact with the bearing nipples of a machine for direct lubrication from the tank.

A hollow sleeve 61 is slidably mounted in the distribution chamber and extends into the outlet port 58 and through the outlet port 59. Apertures 62 are provided in the lower wall of the sleeve and apertures 63 are provided in the upper wall of the sleeve. These apertures are so arranged that when one set lies within the chamber in open communication with the pipe 54, the other will be closed, whereby the lubricant from the reservoir will pass through only one of the ports. It will be understood that the partition 64 is secured within the sleeve 61 intermediate the sets of apertures therein to prevent passage of lubricant through the sleeve. A coil spring 65 engages a shoulder 66 extending from the sleeve and will normally maintain the sleeve in its uppermost position, thereby closing the apertures for feeding lubricant to the filler nozzle 57 and placing the lower set of apertures in the sleeve within the chamber so that they establish communication between the flexible conduit and the pump casing.

The nozzle 57 is pressed into the open end of the sleeve which extends through the outlet port 59 of the chamber and is provided with a passage 67 which extends axially therethrough. The outer end of the nozzle provides an outer circular edge 68, against which the semi-spherical inlet face of the lubricating apparatus can be manually held in contact. The semi-spherical face of the inlet member in the end of the handle of the lubricating apparatus is large enough to fit over the end of the nozzle and when held against the edge of the nozzle end, a leak-proof joint is made while lubricant is being ejected therethrough under pressure. This contact can be maintained at various angular relations, as long as the contacting face encloses the circular edge of the nozzle.

To fill the lubricating apparatus, the semi-spherical face is placed over the end of the nozzle and the handle is pressed against the nipple, making the leak-proof contact and moving the sleeve inwardly so that the apertures 63 will lie within the distributing chamber in open communication with the pump casing. While the lubricating apparatus is held in this relation, the operator reciprocates the piston 47, forcing lubricant from the reservoir through the handle and piston rod of the lubricating apparatus and into the container beneath the piston therein.

It will thus be seen that the lubricating apparatus can be filled with a charge of lubricant from a source of external supply by pressing the inlet member in the handle against the nozzle of the reservoir, and rotating the pump operating gear to force lubricant from the reservoir into the container of the lubricating apparatus. It will also be seen that the connection formed between the lubricating apparatus and the reservoir can be quickly made and is leak-proof.

It will be understood that an inlet could be made through the container, instead of the handle, and that other forms of reservoirs than that described, for dispensing lubricant under pressure, could be used in this connection. Various changes could be made in the construction of the embodiment of my invention described without departing from the spirit of the invention and the scope of the claims.

What I claim is:

1. A lubricant compressor comprising a barrel, a low pressure compressing means therein, high pressure compressing means in communication with said barrel, a rigid handle adapted to actuate both of said means simultaneously, and an inlet conduit extending through said handle and including a check valve and coupling member in the outer end of said handle, said coupling member having a semi-spherical contact surface and being adapted to form a seal with a part of a lubricant discharging device when pressed thereagainst at various angular relationships.

2. A lubricant compressor comprising a barrel, co-axially moving high and low pressure compressing means in said barrel, a single handle member operating by axial thrust thereon to operate both of said means, said means being at opposite ends of said barrel, and means for conducting lubricant through one of said compressing means into said barrel.

3. A lubricant compressor comprising co-axially moving high and low pressure compressing means, a single handle member for operating both of said means, a barrel, said means being spaced along said barrel, and means for conducting lubricant between said compressing means through said handle member.

4. A lubricant compressor comprising a container, mechanism carried by said container for compressing and ejecting lubricant therefrom, a handle member for actuating said mechanism, said handle member having a check valved inlet and passage through said handle for filling said container, said handle member being rigid and available for pushing said inlet against a discharge terminal for establishing a filling connection.

In testimony whereof I hereunto affix my signature this 12th day of May, 1924.

HAROLD H. BRAND.